United States Patent [19]

Bornstein et al.

[11] Patent Number: 4,987,305

[45] Date of Patent: Jan. 22, 1991

[54] INFRA-RED SENSING SYSTEM

[75] Inventors: Aharon Bornstein, Holon; Gideon Cinader, Rehovot, both of Israel

[73] Assignee: State of Israel, Atomic Energy Commission, Soreg Nuclear Research Center, Israel

[21] Appl. No.: 397,382

[22] Filed: Aug. 23, 1989

[30] Foreign Application Priority Data

Sep. 1, 1988 [IL]  Israel ..................... 87640

[51] Int. Cl.⁵ ............... G01J 5/08; G01J 5/28
[52] U.S. Cl. .................... 250/352; 250/330; 250/332; 250/334; 250/338.1; 250/338.5; 250/342; 250/353; 250/347; 250/227.20
[58] Field of Search ............. 250/330, 332, 338.1, 250/338.2, 338.3, 338.4, 338.5, 342, 352, 353, 347, 334, 227.11, 227.20, 238; 350/96.24, 96.25, 96.26

[56]  References Cited

U.S. PATENT DOCUMENTS

| 4,408,827 | 10/1983 | Guthrie et al. ............... 350/96.10 |
| 4,427,881 | 1/1984 | Ruell ......................... 250/227.11 |
| 4,609,820 | 9/1986 | Miyamoto .................... 250/338.1 |
| 4,619,533 | 10/1986 | Lucas et al. ................. 374/141 |
| 4,750,834 | 6/1988 | Fateley ....................... 356/346 |
| 4,760,421 | 7/1988 | Margolin ..................... 355/1 |
| 4,806,761 | 2/1989 | Carson et al. ............... 250/332 |
| 4,815,816 | 3/1989 | Schneider ................... 350/96.25 |
| 4,837,777 | 6/1989 | Jones et al. ................. 374/142 |

FOREIGN PATENT DOCUMENTS 0100124  2/1984  European Pat. Off. .

Primary Examiner—Constantine Hannaher
Assistant Examiner—Edward J. Glick
Attorney, Agent, or Firm—Steinberg & Raskin

[57]  ABSTRACT

An IR sensing system wherein the focal area is located outside the casing that holds a detector array and a bundle of optical fibres leads from the focal area to the detector array in the array such that the inner, emitting end of each fibre of the bundle is in proximate relationship with only one single detector.

14 Claims, 2 Drawing Sheets

INFRA-RED SENSING SYSTEM

FIELD OF THE INVENTION

The present invention is in the field of infrared (IR) sensing and imaging, i.e. sensing and imaging based on the detection of infrared radiation in the range of the so-called MW and LW atmospheric "windows" which are transparent at wavelength bands of 3-5 and 8-12 microns, respectively. Such IR sensing and imaging has increased dramatically in importance in recent years, typical applications being IR sighting, night vision and the automatic navigation of missiles by homing based on IR detection.

BACKGROUND OF THE INVENTION AND PRIOR ART

IR sensing and imaging is based on detecting a temperature and/or emissivity differences on the surface of an object and between the object and its surroundings. The main radiation emitted by surfaces at ambient temperature is in the LW range. For sensitive detection in the LW range the detector has to be kept at a temperature that is considerably lower than the ambient temperature and it is therefore common practice to keep the detectors at a cryogenic temperature of about 77° K. For sensitive operation, detectors for the MW range should also be cooled to about 77° K.

To achieve this, all state of the art IR detector devices comprise specially designed Dewars which have a socket holding a so-called cold finger generating the required cryogenic temperature and which is in thermal contact with a detector array, and a sealed chamber (detector chamber) with an IR transparent window for admitting received and focused IR radiation which houses the detectors so as to face the said IR transparent window. The detector chamber is usually evacuated and outside thereof there is provided an optical focusing system whose focus is in the plane of the detector array inside the detector chamber.

The detector chamber of the Dewar further holds a so-called cold shield or cold stop which serves as aperture and is designed to admit only the convergent IR radiation arriving from the optical focusing system. Due to the fact that the backside of the cold shield is cold, it does not emit interfering IR radiation of its own which, if it were to happen, would disturb the imaging process.

There are also known some IR detector devices with a non-evacuated detector chamber. In these devices there exists a great heat load on the refrigerator which is undesired. Moreover, the window may be extensively cooled which can lead to moisture condensation on the outer side thereof which interferes adversely with the operation. Consequently IR detector systems with non-evacuated detection chamber were found to be limited in use.

The detectors in an IR detection system of the kind specified are selected from among a small group of compounds such as $Hg_{1-x} Cd_x$ Te (MCT), InSb, $Pb_{1-x}$ $Sn_x$ Te (LTT) and others. The most commonly used material for the LW range detectors is MCT. The preparation of this material and the fabrication of detector devices therefrom are done by very special techniques under most rigorously controlled conditions. However, the total production yield of detector arrays for the LW radiation range with the quality and performance required for military use, is very low and accordingly the currently used detector devices are predominantly linear arrays of photoconductive (PC) type detectors The fabrication techology of photovoltaic type (PV) detector arrays, on the other hand, is not yet mature and the production yield of such devices is extremely low. Usually too many detectors in a PV detector array are of too pure quality and such devices are not accepted for use in systems even when a fair proportion of the detectors in an array do have the required quality.

It has been recognized that PV type detector devices would be very useful because they can be connected to existing multiplexing devices for signal processing inside the detector chamber. Focal Plane Array (FPA) devices are at present the ultimate structure and comprise a mosaic, two dimensional PV detector array structure, with a monolitic or hybridic attached Charge Coupled Device (CCD) type signal processor. Such an array can record at once the entire image field of view, as required by the IR optical staring assembly. No scanning is needed in this case. The external signal processing hardwork is relatively simple and a very large number of densely arranged detectors could in principle be incorporated in such a FPA device, but as mentioned above the present production yield of such devices is much too low. Therefore at present most IR detection systems for the 8-12 micron range comprise MCT photoconductive linear detector arrays, which covers at once only a fraction of the object space, and the field of view is scanned at high speed through the object space. By one scanning method, the so-called serial scan technique, the detector array is made to scan successively adjacent strips of the object space moving during each sweep from left to right or right to left, as the case may be, and downward or upward, again as the case may be, between sweeps. By another scanning technique, the so-called parallel scanning, a one-dimensional array is scanned across the object space. In either scanning system, the interstices between the individual detectors in an array may distort the resulting image.

EP A1 0100124 discloses an IR imaging/homing system of the kind specified, in which a Dewar with an evacuated detector chamber and cooled detectors are located out of the focal plane of the optical system. While the Dewar flask is static, the optical system is swingable for scanning purposes, and this is the heart of that invention. One end of a bundle of optical fibres is located at the focal area of the optical system outside the flask and the other end of the optical fibre bundle is also located outside the Dewar flask with a lens system outside the Dewar flask focusing the emerging IR radiation on the detectors inside the detector chamber through a Dewar IR window, and it is alleged that the terminal of each optical fibre is targeted onto one particular detector of the array. As the detectors are usually very small, such alignment is quite difficult.

SUMMARY OF THE INVENTION

In the following description and claims the description "infrared (IR) sensing system" will be used generally and indiscriminantly for IR sensing, homing and imaging systems.

In accordance with the invention there is provided infrared sensing system having a cooled detector assembly comprising an insulating casing holding a detector chamber with an array of cooled detectors in thermal contact with a cryogenic refrigerator, processor means for processing electric signals generated in the detectors by received and focused infrared radiation, conductor means for conducting said electric signals to said processor means and an infrared radiation focusing system having its focal area outside the casing, characterized in that said focal area outside the casing is optically linked to said array of cooled detectors by a bundle of optical fibres having receiving and emitting ends and capable of conducting infrared radiation, the receiving ends of all fibres being located in said focal area and the emitting end of each fibre being located in proximity relationship with only one single detector of the array.

The detectors in a detector chamber of a system according to the invention may be of the photoconductive (PC) or photovoltaic (PV) type and be responsive to different wavelengths.

The electric signals may be conducted to the processor means either directly by said conductor means or via a multiplexer. The processor means may be outside the insulating casing or within.

Due to the fact that in accordance with the present invention each detector of an array is unequivocally associated with one single fibre only, it is possible to provide a bundle of optical fibres whose receiving ends, preferably closely packed, cover the entire object space in the focal area, and in association therewith a detector array or several detector arrays including an excessive number of detectors without discrimination between good and bad ones, and to link the emitting ends of the fibres only to those detectors of the array or arrays whose qualities were found by standard tests to be adequate. In this manner, and as long as the total number of detectors in each array is not excessively large, a full mosaic detector array can be produced at a fraction of the price that such an array would cost in accordance with the state of the art. With such a detector array it is possible to do without scanning.

It should be noted that in accordance with the invention it has for the first time become possible to utilize these much more readily available PC detectors for starring technology.

Alternatively to a full mosaic detector array it is also possible in accordance with the invention to produce an array of detectors that corresponds only to a fraction of the object space and in this case scanning will be required. Here too one can use detector arrays that include an excessive number of detectors without discrimination between good and bad ones, and to link the emitting ends of the fibres only to those detectors of the array or arrays whose qualities were found by standard tests to be adequate.

When PV detectors are used they may be connected by wire bonding to multiplexing devices inside the detector chamber.

The fact that in accordance with the invention the focal area that is outside the insulating casing and the array of detectors that is within the detector chamber are optically linked by optical fibres in the manner specified, leads to further significant advantages. For one there is no need for a special lens system for transmitting the IR radiation emerging from the emitting end of each optical fibre to an associated detector as in EP A1 0100124. Moreover, as distinct from EP A1 0100124 where alignment between the emitting ends of the fibres and the associated detectors is difficult and not quite reliable because it is effected indirectly by a lens system, in accordance with the invention the alignment is physical and direct and is therefore easier and more reliable. Moreover, there is no need for a window in the casing, nor does the detector chamber have to be evacuated as distinct from the need for Dewar flasks in conventional systems. Furthermore, whereas in conventional systems the possible locations of the detectors are restricted and depend on the optical design, in the IR sensing systems according to the invention there is much more freedom and space for the arrangement of the detectors and any multiplexers. Still further, since the detectors are not located in the focal plane there are no optical constraints on the arrangement and dimension of the array.

As a result of all this, the design of the casing and the mounting of the refrigerator and detector chamber therein is much simpler and production is rendered much simpler and easier.

A detector array in a detector chamber of a system according to the invention may comprise a plurality of units each consisting of a pair of detectors each of which is sensitive to a different wavelength. Similarly to previous systems, each detector of each pair is coupled to the focal area by an optical fibre with all the receiving ends of the bundle of optical fibres located in the focal area being close-packed and arranged in the scanning direction, i.e. facing the impinging IR radiation. In this way the signals produced by the two detectors of each unit can be synchronized to get an accurate two-colour picture.

In a similar manner a detector array in a system according to the invention may comprise units consisting each of three or more different detectors each sensitive to a different wavelength, to obtain in this way a multicolour picture.

Alternatively, discrimination between different wavelengths may also be accomplished by using different kinds of optical fibres capable of transmitting infrared light of different wavelength.

DESCRIPTION OF THE DRAWINGS

The invention will now be described, by way of example only, with reference to the annexed drawings to which the invention is in no way limited. In these drawings.

DESCRIPTION OF SPECIFIC EMBODIMENTS

Figure 1:
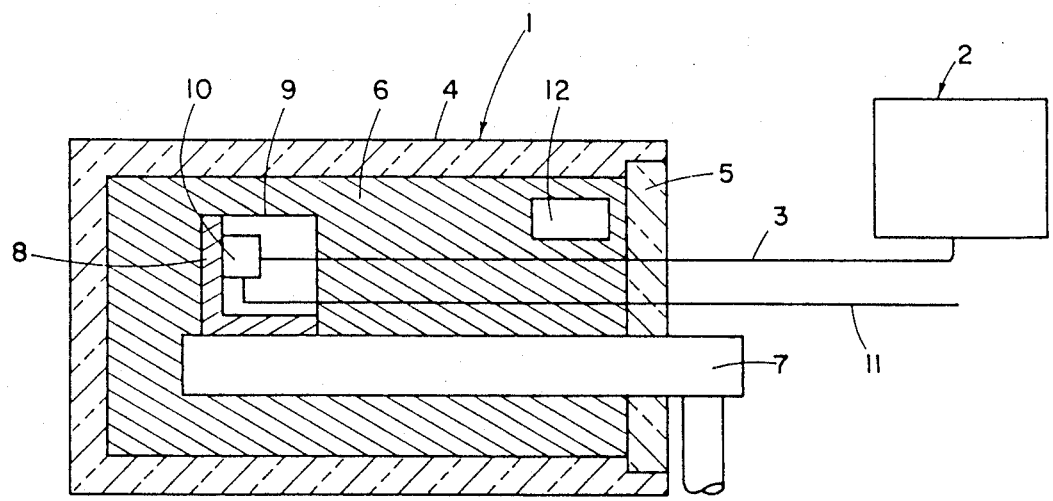
FIG. 1 is a schematic illustration of one embodiment of an IR sensing system according to the invention.

The embodiment of an IR sensing system according to the invention shown in FIG. 1 comprises a detector assembly 1 and a focusing device 2 optically linked by a bundle of optical fibres symbolized by line 3. The focusing device 2 may be of any conventional design and the receiving end of the optical fibre bundle 3 is located in the focal area thereof.

The detector assembly 1 according to the invention comprises a casing 4 with a lid 5 and stuffed with thermal insulating material 6. A cryogenic refrigerator 7 is embedded within the thermally insulating material 6 and is in thermal contact with a cooled mounting bracket 8 forming part of a detector chamber 9 and having mounted thereon a detector array 10. The emitting end of each fibre of bundle 3 is in close proximity association with only one of the detectors, all the optically linked detectors of the array having been selected out of a larger group constituting the array, upon establishment of their adequate performance.

A bundle of electric conductors symbolised by line 11 and adapted to conduct electric signals generated by the detectors, connect detectors 10 to suitable processor means as known per se (not shown), which in this embodiment is outside casing 4 but which may also be within. Casing 4 further holds a moisture absorber 12 which is embedded within insulating material 6.

Due to the provision of the thermal insulating material and the absence of any IR window, casing 4 need not be evacuated which obviously simplifies the design and assembly of the detector chamber.

The receiving ends of all the fibres in bundle 3 located in the focal area of focusing device 2 may be closely packed. The overall shape of the receiving end of the bundle may be chosen to meet design requirements and be flat, convex, concave, and have a circular or non-circular perimeter. The overall shape of the emitting end of the bundle must match the pattern of the detectors.

In operation the focusing device 2 receives the arriving infrared radiation and focuses it onto a focal plane wherefrom it is conducted by the optical fibre bundle 3 to detectors 10. Any scanning that may be required is performed in the focusing device 2 in such a way that the receiving end of bundle 3 scans the object space in the focal area. Where the receiving ends of the optical fibres are arranged in a full mosaic fashion, no scanning is required.

Detectors 10 produce electric signals which are led to the processing system through the conductor bundle 11.

Figure 2:
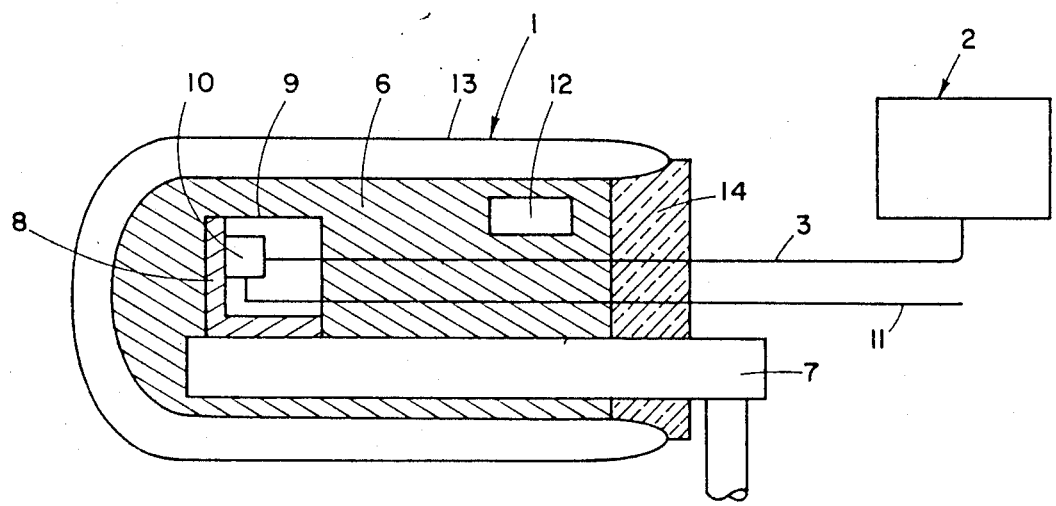
FIG. 2 is a schematic illustration of another embodiment of an IR sensing system according to the invention.

The design of the IR sensing system according to the invention shown in FIG. 2 is essentially similar to that of FIG. 1, but as distinct therefrom the casing of chamber (but not the chamber itself!) 1 is of the Dewar type with space 13 of the double wall evacuated and the surface optionally silver plated. In FIG. 2 similar parts are indicated by the same numerals as in FIG. 1 and the casing here comprises a U-shaped Dewar flask 13 sealed by lid 14. The operation of this embodiment is the same as the previous one.

Figure 3:
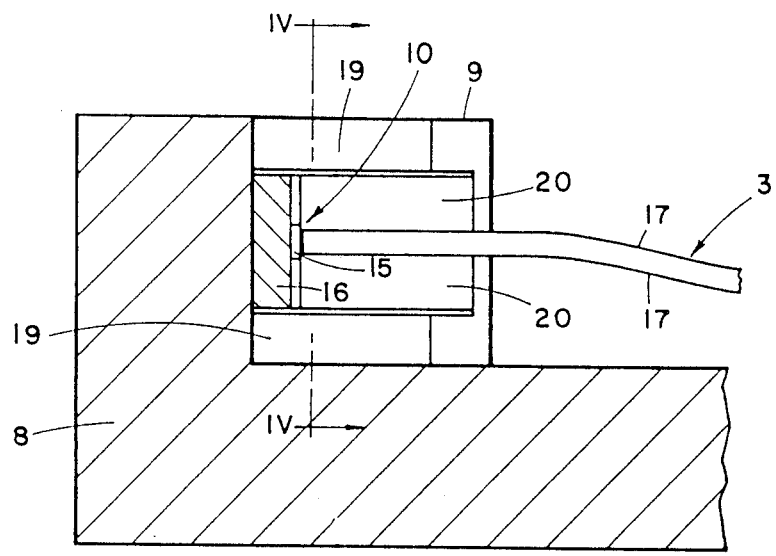
FIG. 3 is a fractional schematic illustration of an IR detecting system according to the invention showing the detector region inside the detector chamber.
Figure 4:
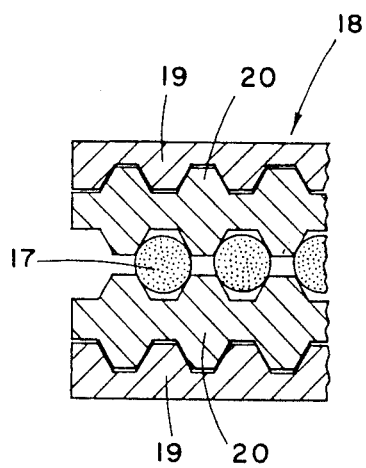
FIG. 4 is a section along line IV—IV of FIG. 3.

In FIGS. 3 and 4, the manner of aligment of the emitting ends of the optical fibres of a bundle 3 with the individual detectors of an array 10 inside chamber 9 is shown. It is seen here that a horizontally arranged linear array 10 of detectors 15 (only one of which is seen), is mounted on a detector substrate 16 that is in thermal contact with the cooled mounting bracket 8. The individual optical fibres 17 of bundle 3 are each aligned with one detector 15 by means of a splicer 18 comprising two chips of a first kind 19 and two chips of a second kind 20 in interlocking engagement as shown in FIG. 4. The chips of the first kind grip the detector substrate 16 and the chips of the second kind, which latter grip the fibres 17, again as shown in FIG. 4.

The various chips 19 and 20 are preferably made of or coated with IR absorbing material and due to the separation of the individual fibres from each other as shown, the detection angle of each detector should b limited to the image forming light cone of the associated fibre.

As the splicer 18 is cold it also acts as a cold shield or stop. If desired, the end portions of the chips 19 and 20 which correspond to the emitting ends of the fibres may be coated or covered with antireflecting and/or filter material.

I claim:

1. An infrared sensing system having a cooled detector assembly comprising an insulating casing holding a detector chamber with an array of cooled detectors in thermal contact with a cryogenic refrigerator, processor means for processing electric signals generated in the detectors by received and focused infrared radiation, conductor means for conducting said electric signals to said processor means and an infrared radiation focusing system having its focal area outside the casing, which focal area is optically linked to said array of cooled detectors by a bundle of optical fibres having receiving and emitting ends and capable of conducting infrared radiation, the receiving ends of all fibres being located in said focal area and the emitting end of each fibre being directly linked to only one single, associated detector of the array and comprising said insulating casing being stuffed with thermally insulating material and not being evacuated.

2. An infrared sensing system according to claim 1, wherein the receiving end of said bundle of optical fibres covers the entire object space in the focal area.

3. An infrared sensing system according to claim 1, wherein the receiving end of said bundle of optical fibres covers only a fraction of the object space in the focal area, and further comprising means for the receiving end of the optical fibre bundle to scan the object space in the focal area.

4. An infrared sensing system according to claim 1, wherein said array of cooled detectors includes an excessive number of detectors without discrimination between adequate and inadequate ones, the ends of the optical fibres being linked only to those detectors of each array whose respective qualities are found adequate by standard tests.

5. An infrared sensing system according to claim 1, wherein each detector array comprises a plurality of units each comprising at least two different detectors each of which is sensitive to a different wavelength whereby a multicolour picture is obtained.

6. An infrared sensing system according to claim 1, wherein at least two different kinds of optical fibre are used which transmit infrared light of different wavelengths, whereby a multicolour picture is obtained.

7. An infrared sensing system according to claim 1, wherein the detectors are of the photoconductive type.

8. An infrared sensing system according to claim 1, wherein the detectors are of the photovoltaic type.

9. An infrared sensing system according to claim 1, wherein the direct linking between the emitting end of each fibre and said single associated detector is effected by means of a splicer comprising a pair of chips of a first kind of interlocking engagement with a pair of chips of a second kind, the former chips securely holding a detector mounting substrate and the latter chips clamping between them each fibre of the bundle separate from any other fibre, whereby the detecting angle of each detector is confined to the image forming light cone emitted from the emitting end of the associated fibre.

10. A detector chamber according to claim 9, wherein said splicer is made of or coated with infrared radiation absorbing material.

11. An infrared sensing system according to claim 2 wherein said array of cooled detectors includes an excessive number of detectors without discrimination between adequate or inadequate ones, the ends of the optical fibres being linked only to those detectors of each array whose respective qualities are found adequate by standard tests.

12. An infrared sensing system according to claim 3, wherein said array of cooled detectors includes an excessive number of detectors without discrimination between adequate or inadequate ones, the ends of the optical fibres being linked only to those detectors of each array whose respective qualities are found adequate by standard tests.

13. An infrared sensing system according to claim 2, wherein at least two different kinds of optical fibres are used which transmit infrared light of different wavelengths, whereby a multicolor picture is obtained.

14. An infrared sensing system according to claim 3, wherein at least two different kinds of optical fibres are used which transmit infrared light of different wavelengths, whereby a multicolor picture is obtained.

* * * * *